United States Patent [19]

Odaka et al.

[11] Patent Number: 4,646,171

[45] Date of Patent: Feb. 24, 1987

[54] APPARATUS FOR RECORDING AND/OR REPRODUCING DIGITAL INFORMATION SIGNAL

[75] Inventors: Kentaro Odaka; Tadashi Fukami; Shinya Ozaki, all of Kanagawa, Japan

[73] Assignee: Sony Corporation, Tokyo, Japan

[21] Appl. No.: 858,579

[22] Filed: Apr. 28, 1986

Related U.S. Application Data

[63] Continuation of Ser. No. 625,292, Jun. 27, 1984, abandoned.

[30] Foreign Application Priority Data

Jun. 28, 1983 [JP] Japan .................. 58-116781

[51] Int. Cl.[4] .......................... G11B 5/00; H04N 5/76
[52] U.S. Cl. ......................................... 360/32; 369/59
[58] Field of Search ............................. 360/32; 369/59

[56]  References Cited

U.S. PATENT DOCUMENTS 4,348,699  9/1982  Tsuchigo et al. ..................... 360/32
4,404,602  9/1983  Hoshimi et al. ...................... 300/32
4,463,387  7/1984  Hashimoro et al. .................. 360/32

OTHER PUBLICATIONS

"Some Nores on Digital Audio Topies" by M. Willcocks, Journal of the Audio Engr. Soc. Jul./Aug. 1978 vol. 26 #7/8.

Primary Examiner—Vincent P. Canney
Attorney, Agent, or Firm—Eslinger, Lewis H.; Alvin Sinderbrand

[57]  ABSTRACT

An apparatus for recording and/or reproducing digital information signal with sampling frequencies fs1, fs2, fs3, --- fsn comprising circuit for selecting one of the sampling frequency, and circuit for generating a field clock having a field frequency F determined by a following equation;

$$fs1/N1 = fs2/N2 = fs3/N3 = \cdots = fsn/Nn = F$$

wherein N1, N2, N3, ---Nn are the number of data words in one field.

10 Claims, 6 Drawing Figures

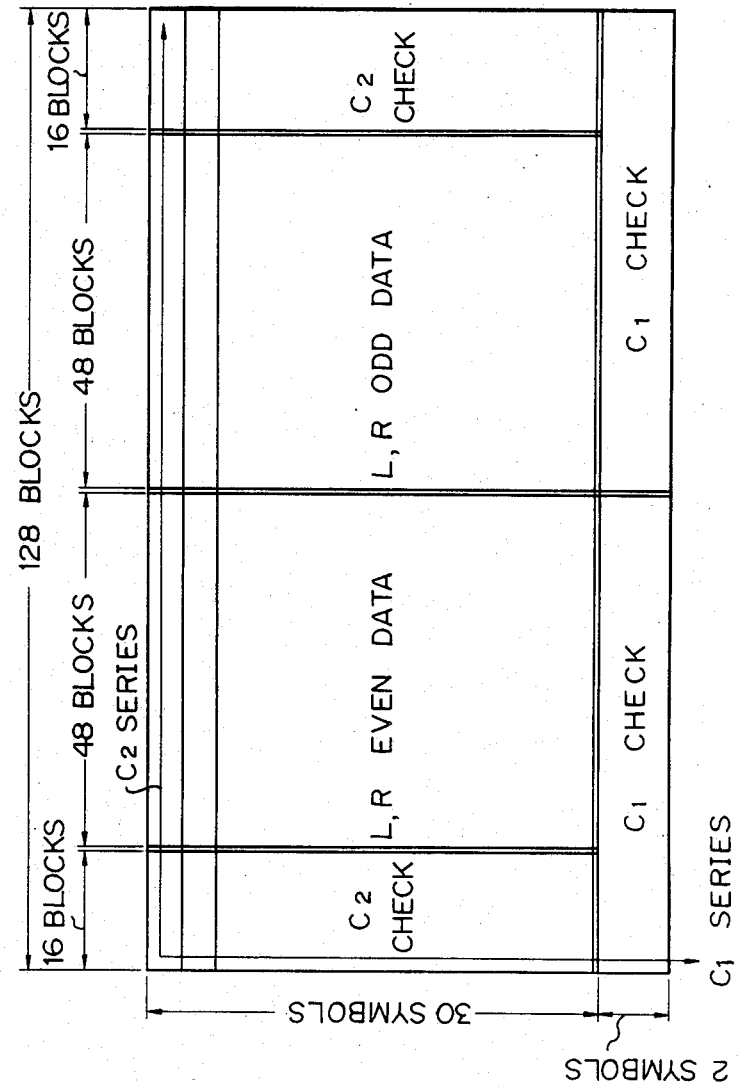

FIELD A
Fs=48K
1 WORD=16-BIT
FIELD B
2000 rpm

FIELD A
Fs=44.1K
1 WORD=16-BIT
FIELD B
2000 rpm

FIELD A
Fs=32K
1 WORD=16-BIT
FIELD B
2000 rpm

APPARATUS FOR RECORDING AND/OR REPRODUCING DIGITAL INFORMATION SIGNAL This is a continuation of application Ser. No. 06/625,292 filed June 27, 1984, now abandoned.

BACKGROUND OF THE INVENTION

1. Field of the Invention

The present invention relates to an apparatus for recording and/or reproducing digital information signal which is suitable for use in, for example, recording an audio PCM signal on a magnetic tape by a rotary head.

2. Description of the Prior Art

In the case where a plurality of sampling frequencies, for example, 44.1 KHz and 48 KHz, are selectively used for modulating an analog audio signal into an audio PCM signal, it is desirable that the audio PCM signals of any sampling frequencies can be recorded and reproduced in the same apparatus.

In a conventional PCM tape recorder with a rotary head, in order to keep a recording density constant, the running speed of a magnetic tape and the operation speed of a recording processing circuit are varied in proportion to the sampling frequency of the audio PCM signal to be recorded.

There is, however, a problem that many parts must be switched or altered according to the sampling frequency.

First of all, it is necessary to switch a reproducing equalizer circuit and a PLL (Phase Locked Loop) circuit for clock reproduction and, it is also necessary to switch a capstan servo circuit and a drum servo circuit to change the running speed of a magnetic tape. Furthermore, another inconvenience occurs in that recording time per one cassette is changed, when the tape speed is varied. Moreover, there is such a defect that it is difficult to coincide the time code for editing with absolute time at the different sampling frequencies.

OBJECTS AND SUMMARY OF THE INVENTION

Therefore, it is an object of the present invention to provide an apparatus for recording and/or reproducing digital information signal wherein changes in tape speed, rate of drum rotation and in an associated analog circuit (equalizer, PLL etc.) are not necessary, whenever the sampling frequency is different.

It is another object of the present invention to provide an apparatus for recording digital information signal wherein changes in the constitution of the recording system, for example, in an encoder of the error correction code, in the frequency of the master clock for the recording data processing circuit, in the capstan or drum servo circuit, are not necessary, whenever the sampling frequency is different.

It is a further object of the present invention to provide an apparatus for reproducing digital information signal wherein changes in the constitution of an analog circuit (equalizer, PLL etc.) and decoding circuit are not necessary, whenever the sampling frequency is different.

It is a further object of the present invention to provide an apparatus for recording and/or reproducing digital information signal wherein the number of parts to be changed can be minimized, and it is not necessary to provide a circuit corresponding to the difference of the sampling frequency.

It is a further object of the present invention to provide an apparatus for recording and/or reproducing digital information signal wherein the recording time per a predetermined quantity, for example, one cassette is not changed, and such inconvenience that the time code does not coincide with the absolute time does not occur.

According to the present invention, the above objects are accomplished by an apparatus for recording and/or reproducing a digital information signal with sampling frequencies fs1, fs2, fs3, - - - fsn comprising; a circuit for selecting one of said sampling frequencies; a circuit for generating a field clock having the field frequency F determined by a following equation;

$$fs1/N1 = fs2/N2 = fs3/N3 = \cdots = fsn/Nn = F$$

whereas N1, N2, N3, - - - Nn are the number of data words in one field.

BRIEF DESCRIPTION OF THE DRAWINGS

FIG. 3 is a schematic diagram showing a data constitution of one field in one embodiment of the present invention.

DETAILED DESCRIPTION OF THE PREFERRED EMBODIMENTS

Figure 1:
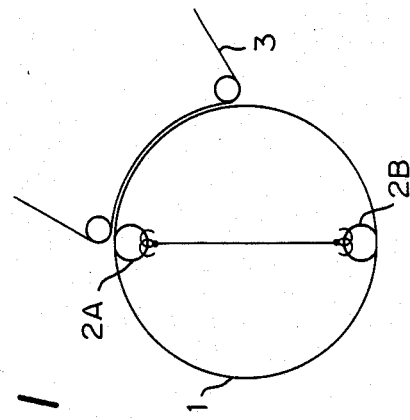
FIG. 1 is a schematic diagram showing a head arrangement of one embodiment of the present invention.

Referring to the drawings, the present invention is described.

In FIG. 1, a rotary tape guide drum 1 has a pair of magnetic heads 2A, 2B.

The magnetic tape 3 is wrapped at wrap angle of about 90 degree around the tape guide drum 1 having a diameter of 30 mm and is run under this condition. The tape guide drum 1 is rotated at a frame frequency of, for example, 100/3 Hz so that data of every one field is recorded as an oblique segment on the magnetic tape 3 by the magnetic heads 2A, 2B, alternately.

Figure 2:
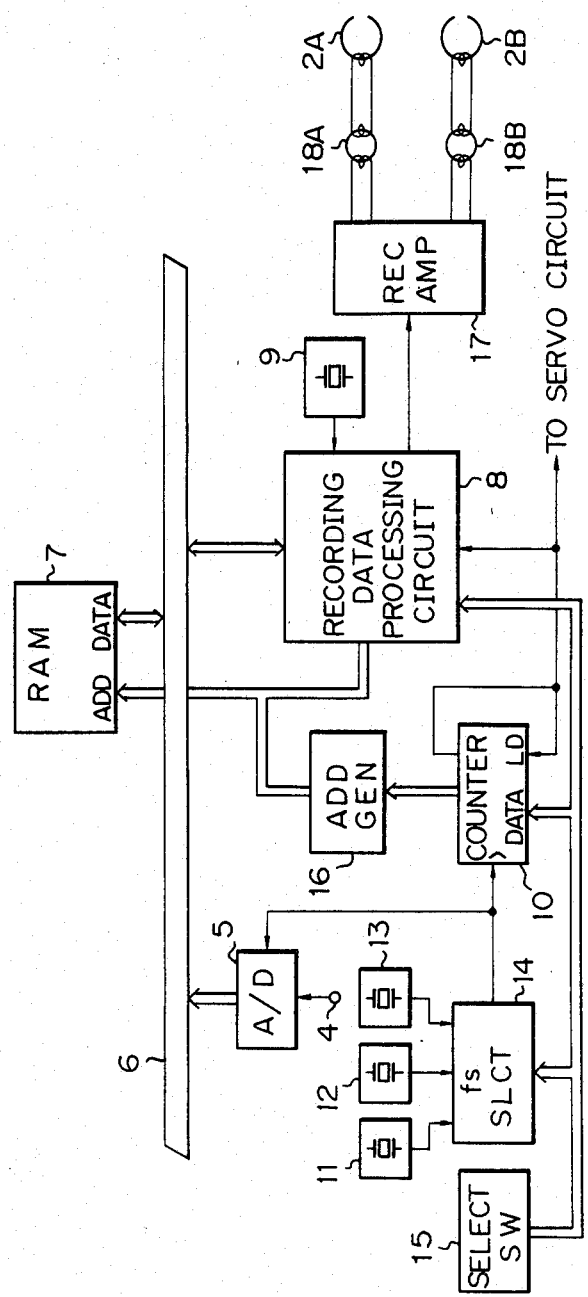
FIG. 2 is a block diagram showing a circuit arrangement of one embodiment of the present invention.

FIG. 2 shows a construction of recording circuit. An input terminal 4, which is supplied with an analog audio signal to be recorded, is connected to an A/D converter 5, in which the audio signal is digitized into a digital data word of 16 bits at every sampling data so as to be supplied to a data bus 6.

In connection with the data bus 6, a RAM 7 (Random Access Memory) and a recording data processing circuit 8 are provided. The audio PCM signal derived at the output of the A/D converter 5 is written into the RAM 7, and then read out from the RAM 7 so as to be supplied to the recording data processing circuit 8.

The recording data processing circuit 8 manages encoding of error correction code, interleaving, time base compressing and digital signal modulation. For such management, a master clock is supplied from a clock generating circuit 9 as well as a clock of the field frequency (a field clock) from a counter 10.

Sampling clock signal generating circuits 11, 12, 13 produce sampling clocks of frequency fs1, fs2, fs3, respectively (for instance, fs1=48 KHz, fs2=44.1 KHz, fs3=32 KHz). The outputs of the sampling clock generating circuits 11, 12, 13 are supplied to a selector 14.

The selector 14 is controlled by a selecting signal which is produced by a selecting switch 15 so that the sampling clock of predetermined frequency is supplied to the A/D converter 5 and the counter 10. The selecting signal is supplied to the preset input terminal of the counter 10 and the recording data processing circuit 8.

The counter 10 derives the field clock as well as a parallel output which is supplied to an address signal generating circuit 16. The address signal generating circuit 16 provides the RAM 7 with an address signal which varies sequentially. The recording data processing circuit 8 supplies the RAM 7 with an address signal for interleaving. According to the address signal from the recording data processing circuit 8, the audio PCM signal is written into the RAM 7 with interleaving as well as check words of an error correction code which is generated in the recording processing circuit 8. Then, the PCM words and check words are sequentially read out from the RAM 7 according to the address signal from the address generating circuit 16.

The RAM 7 has twice the memory capacity as normally required to be able to store the data of one segment so that while the encoding of error correction code of the PCM data which is stored in one side memory area is carried out, the input PCM data is stored in the other side memory area. the recording data from the recording data processing circuit 8 is supplied to the rotary heads 2A, 2B through rotary transformers 18A, 18B and is recorded on the magnetic tape 3.

FIG. 3 shows a code constitution of the data included in one field. the PCM data and two kinds of check data of the error correction codes C1, C2 compose a two-dimensional array, in which one block (one column) consists of 32 symbols of each row in the vertical direction and 128 blocks to which block addresses of 0 to 127 are numbered are arranged in the horizontal direction. A first error correction code C1 is added to the vertical direction of such two-dimensional array, while a second error correction code C2 is added to its horizontal direction. The encoding of the error correction is performed using eight bits as one symbol, therefore, sampled data of one word (16 bits) is divided into most significant 8 bits and least significant 8 bits. The two-dimensional array includes the PCM data symbols of audio signal channels (L, R).

Figure 4A:
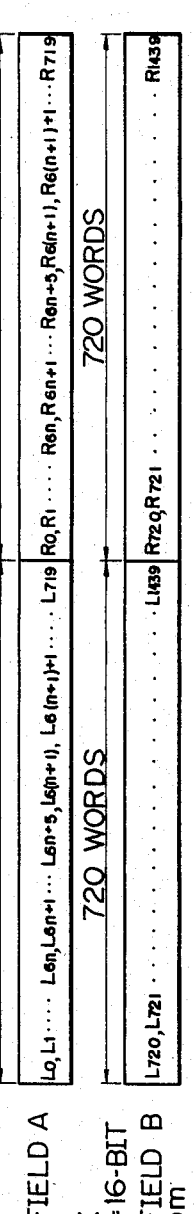
FIGS. 4A, 4B and 4C are schematic diagrams showing a format of a recording data in one embodiment of the present invention.

When the sampling frequency is fs1 (=48 KHz), the PCM data of total 1440 words with regard to the both channels of L0 to L719 and R0 to R719 are recorded in one segment as shown in FIG. 4A. The symbols of 1440 (=720×2) symbols, which are included in the words bearing odd numbers of each channel among the PCM data of one segment, compose 48 blocks, and the symbols of same number, which are included in the words bearing even numbers of each channel among the PCM data of one segment, compose 48 blocks. The error correction code C2 is the Reed Solomon codes over GF ($2^8$) of (32, 24) and 8 check symbols are formed with regard to total 24 symbols of the blocks at every four blocks among the 96 blocks. The C2 check symbols of 32 (=8×4) are arranged at both sides of the two-dimensional array, therefore, total 128 blocks are arranged in the lateral direction.

The encoding of the error correction code C1 is performed using the data of every block. The error correction code C1 is the Reed Solomon codes over GF ($2^8$) of (32, 30). Each two check symbols of error correction code C1 (C1 check symbols) are arranged at the lowest row of the two-dimensional array. The PCM data of one segment are recorded on the magnetic tape 3 sequentially from the first block.

Figure 5A:
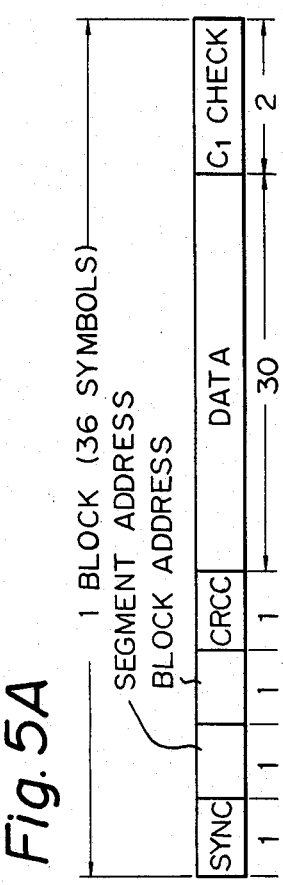
FIG. 5A shows the data formal of each block.

Each block in the arrays shown in FIG. 3 has a data format shown in FIG. 5A. Namely, a block sync signal of eight bit (one symbol) is added to the head, and a segment address of eight bits and a block address of eight bits are added, then a CRC code (eight bits) for error detection of these segment address and block address is added. An MSB of the block address is used to discriminate the block address of the data from the block address of the subcode. Furthermore, the data of 30 symbols (audio data or check code C2) are arranged after this CRC code. Two symbols of check code C1 are arranged in the last portion.

Figure 5B:
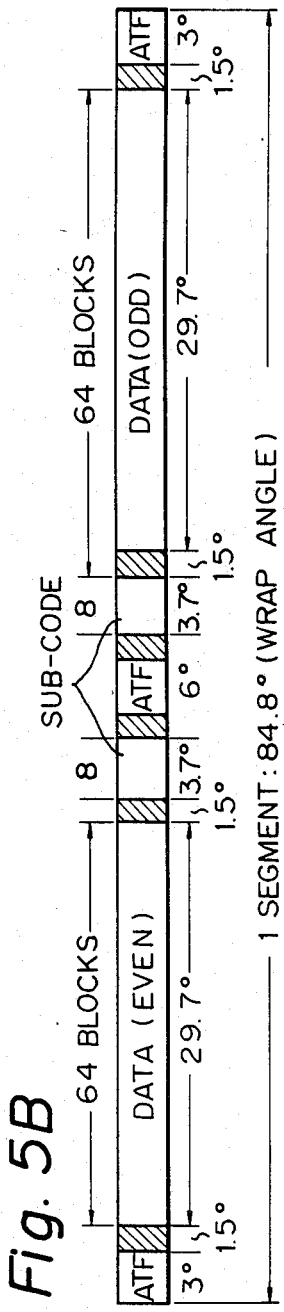
FIG. 5B shows the format of one segment.

On the other hand, the data of one segment which is produced by the rotary head has a data format shown in FIG. 5B. In this embodiment, one segment is formed by the rotary heads 2A and 2B in the oblique direction of the magnetic tape 3 which is wrapped around the tape guide drum 1 having a diameter of 30 mm. Pilot signals ATF for automatically following the track are recorded in each interval of 3 degree in both end portions and central portion of this segment. The reason why the pilot signals are recorded in these three portions is to prevent an occurrence wherein the pilot signals cannot be reproduced due to the dropout. A tracking error is detected due to the reproduction output of these pilot signals ATF and a piezo-electric element which supports the rotary heads 2A, 2B is driven on the basis of this detection, thereby removing the tracking error.

In addition, the data of the block addresses (0 to 63) shown in FIG. 3 are sequentially recorded in a range of an angle of 29.7 degree. Furthermore, the subcodes of four blocks such as time codes, display data and the like are written twice before and after the pilot signal ATF in the central portion. The data of the block addresss (64 to 127) shown in FIG. 3 are sequentially reorded in a range of 29.7 degree. Also, in FIGS. 5A, 5B, the intervals of each angle of 1.5 degree in the hatched portions denote the interblock gaps where no data is recorded and pulse signals of a constant frequency are recorded in these intervals.

Figure 4B:
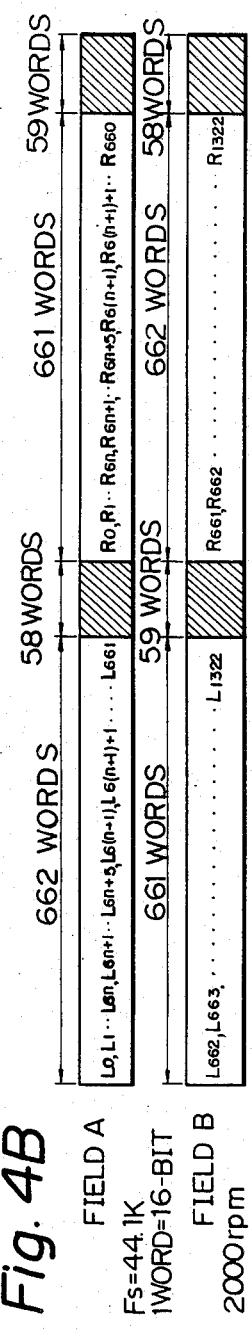
Figure 4C:
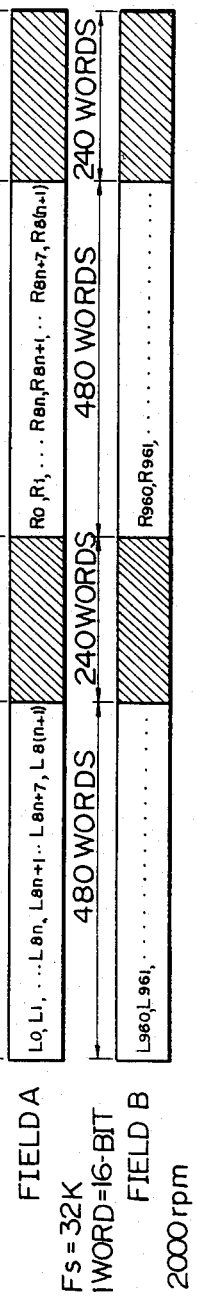

As shown in FIGS. 4B, 4C, when the sampling frequency is fs2 (=44.1 KHz), 1323 words (2646 symbols) of 2 channels are recorded in one field, and when the sampling frequency is fs3 (=32 KHz), 960 words (1920 symbols) of 2 channels are recorded in one field. Whenever the sampling frequency is fs2 or fs3, the constitution of error correcting code is formed in same format as shown in FIG. 3. Namely, the data constutution of one field has (32 symbols×128 blocks), the error correcting codes C1, C2 to be used is not changed. For this reason, the master clock of a single kind is supplied to the recording data processing circuit 8 from the clock generating circuit 9. The number of data words is reduced in proportion to the sampling frequency so as to cause a data blanking area in one field. The data blanking area is inserted with dummy symbols each of which has 16 bits of all "0" or symbols which have control data, for instance.

The sampling frequencies fs1, fs2, fs3 and the numbers N1, N2, N3 of the data words in one field satisfy the following relationship;

$$fs1/N1 = fs2/N2 = fs3/N3 = F,$$

$$48,000/1440 = 44100/1323 = 32000/960 = 100/3 \text{ (Hz)}$$

wherein F is field frequency of the field clock which is generated in the counter 10. the field clock is supplied to the drum servo circuit of the tape guide drum 1 and capstan servo circuit as servo standard signals. the running speed of the magnetic tape 3 is made constant despite the difference of the sampling frequency.

When the sampling frequency is 32 KHz, the number of bits of each sampling words may be reduced from 16 to 14, and the number of data words in one field may be reduced from 960 to 720. In this case, the number of data words in one field is half as great as when the sampling frequency is 48 KHz.

What is claimed is:

1. An apparatus for use in recording and/or reproducing a digital information signal sampled at different sampling frequencies fs1, fs2, fs3, . . . fsn, comprising: means for selecting one of said different sampling frequencies; means receiving said selected sampling frequency for generating a field clock signal having a field frequency F determined by $$fs1/N1 = fs2/N2 = fs3/N3 = \ldots = fsn/Nn = F$$

in which N1, N2, N3 . . . Nn are the number of data words in one field associated with each respective sampling frequency; and means receiving said field clock signal for controlling the number of data words recorded and/or reproduced in one field and for controlling a rest area in said field so that the field frequency remains constant with the changes in the sampling frequency.

2. An apparatus for recording and/or reproducing digital information signal according to claim 1, wherein said digital information data is recorded on a magnetic tape by a couple of rotary heads.

3. An apparatus for recording and/or reproducing a digital information signal according to claim 1, further comprising means for generating said sampling frequencies at 48 KHz and 44.1 KHz, whereby the number of data words in one field are 1440 and 1323, respectively, so that said field frequency is 100/3 Hz.

4. An apparatus for recording and/or reproducing a digital information signal according to claim 1, wherein said rest area includes blanking data and does not contain said digital information signal.

5. An apparatus for recording and/or reproducing a digital information signal according to claim 1, wherein said rest area includes control data and does not contain said digital information signal.

6. A recording circuit for recording an input signal on a magnetic tape by rotary heads, comprising:
means for selecting one of a plurality of sampling frequency signals;
analog-to-digital converter means receiving said input signal and said selected sampling frequency signal for producing a corresponding digital data signal at said selected sampling frequency;
a data bus receiving said digital data signal;
means receiving said selected sampling frequency signal and producing therefrom a field frequency signal and a sequentially varying address signal;
a random access memory connected to said data bus and receiving said sequentially varying address signal; and
a recording processing circuit operably connected to said random access memory through said data bus for controlling writing-in and reading-out of said digital data signal from said random access memory in response to said field frequency signal, thereby controlling the number of data words in one field and controlling a rest area in said field so that the field frequency remains constant with changes in the sampling frequency.

7. A recording circuit according to claim 6, further comprising means for maintaining the magnetic tape speed constant independently of said selected sampling frequency signal.

8. Apparatus according to claim 6, further comprising a recording circuit connected to said recording processing circuit for feeding said digital data signal to said rotary heads.

9. A recording circuit according to claim 6, in which said means for selecting one of a plurality of sampling frequency signals includes means for generating a first signal having a frequency of 48 KHz and a second sampling frequency signal having a frequency of 44.1 KHz.

10. An apparatus for use in recording and/or reproducing a digital information signal sampled at different sampling frequencies fs1, fs2, fs3, . . . fsn, comprising: means for selecting one of said different sampling frequencies; means receiving said selected sampling frequency for generating a field clock signal having a field frequency F determined by $$fs1/N1 = fs2/N2 = fs3/N3 = \ldots = fsn/Nn = F$$

in which N1, N2, N3, . . . Nn are the number of data words in one field associated with each respective sampling frequency; and means receiving said field clock signal for controlling the number of data words recorded and/or reproduced in one field, which are arranged in the same data format and have the same field frequency regardless of changes in the sampling frequency and the number of data words.

* * * * *